CHARLES K. BIRDSALL,
RICHARD W. GROW and
RICHARD M. WHITE
INVENTORS

BY [signature]

ATTORNEY $\beta_0 p/2\pi$ →

CHARLES K. BIRDSALL,
RICHARD W. GBOW and
RICHARD M. WHITE
INVENTORS
BY [signature]
ATTORNEY CHARLES K. BIRDSALL,
RICHARD W. GROW and
RICHARD M. WHITE
INVENTORS BY [signature]

ATTORNEY

CHARLES K. BIRDSALL,
RICHARD W. GROW and
RICHARD M. WHITE
INVENTORS.
BY Urban H. Faubion
ATTORNEY Jan. 4, 1966 C. K. BIRDSALL ET AL 3,227,914

LADDER TYPE SLOW WAVE STRUCTURE HAVING SIDE PLATES AT AN ANGLE OTHER THAN 90°

Original Filed May 15, 1961 5 Sheets-Sheet 5

CHARLES K. BIRDSALL,
RICHARD W. GROW and
RICHARD M. WHITE
INVENTORS

BY [signature]

ATTORNEY 3,227,914
Patented Jan. 4, 1966

3,227,914

LADDER TYPE SLOW WAVE STRUCTURE HAVING SIDE PLATES AT AN ANGLE OTHER THAN 90°

Charles K. Birdsall, Lafayette, and Richard M. White, Los Altos, Calif., and Richard W. Grow, Salt Lake City, Utah, assignors to General Electric Company, a corporation of New York Original application May 15, 1961, Ser. No. 110,210. Divided and this application Mar. 18, 1963, Ser. No. 272,178
11 Claims. (Cl. 315—3.5)

The instant application is a divisional application of S.N. 110,210, filed May 15, 1961, now abandoned.

This invention relates to the class of devices which depend upon an interchange of energy between a stream of electrons and a radio frequency field to provide amplification and/or oscillations. More particularly, the invention relates to the class of high frequency energy interchange devices known as traveling wave tubes which include an electron gun for producing a stream of electrons in an interaction region and a radio frequency circuit or transmission line for producing radio frequency fields in the region or interaction, and the invention has for one of its principal objects the provision of improved radio frequency circuits for use in such devices.

Probably the most common slow wave transmission line or circuit for producing radio frequency fields in the interaction region of a traveling wave tube is a helix. The helix is carefully designed to have the proper pitch and diameter to generate or to amplify electromagnetic waves in the frequency range of interest. This circuit is a very practical circuit when generating or amplifying waves which are longer than, for instance, several centimeters wavelength and it would be a possible structure for amplifying even shorter wavelengths if it were not for the difficulty of physically realizing helix structures which are small enough for millimeter waves. A helix of optimum size for operation at a five millimeter wavelength, for example, has a diameter of the order of that of a human hair and the individual turns are almost impossible to discern by the normal unaided human eye. Consequently such a structure is extremely difficult to make with the accuracy required and its power dissipation capability is so small that it is useless for producing or amplifying any large amount of power.

In order to be constructed practically circuits for millimeter and submillimeter wave devices should be relatively large and in order to utilize electron streams with large powers at practical power densities the circuits should present large cross sectional areas of useful electric field to the stream. A circuit which meets the first requirement is a circuit known as a ladder. The circuit is so named because in its basic form it is simply a series of slots cut in a conductive plane which may be infinite in extent. Thus, a series of parallel rungs are formed between slots which extend between two parallel longitudinal lateral members. The length of the rungs is on the order of half the operating wavelength for the frequency of interest. Improved ladder type circuits and tubes which utilize such circuits are considered here.

The need to increase the cross sectional area of the circuit and the useful electric fields has been met by paralleling the ladders essentially side by side, that is, placing the ladders in parallel planes in such a manner that the electric field from the ladders support each other and directing electron streams between and outside the ladder structures.

In accordance with the present invention single ladder slow wave circuits of basically simple construction are provided to give fundamental forward and backward wave interaction behavior with electron streams which are directed in coupling relation to the electric fields existing in the vicinity of the series of regularly spaced discontinuities of the ladder circuits. Fundamental forward or backward wave behavior is obtained by altering the magnetic and/or electric coupling from slot to slot.

The novel features which are believed to be characteristic of the invention are set forth in more particularity in the appended claims. The invention itself, however, both as to its organization and method of operation, together with further objects and advantages thereof, may best be understood by reference to the following description taken in connection with the accompanying drawings in which:

FIGURE 3 is an $\omega$-$\beta$ diagram for the plane ladder of FIGURE 2 and illustrates characteristics of the ladder circuit which are described in detail below;

Figures 1, 2:
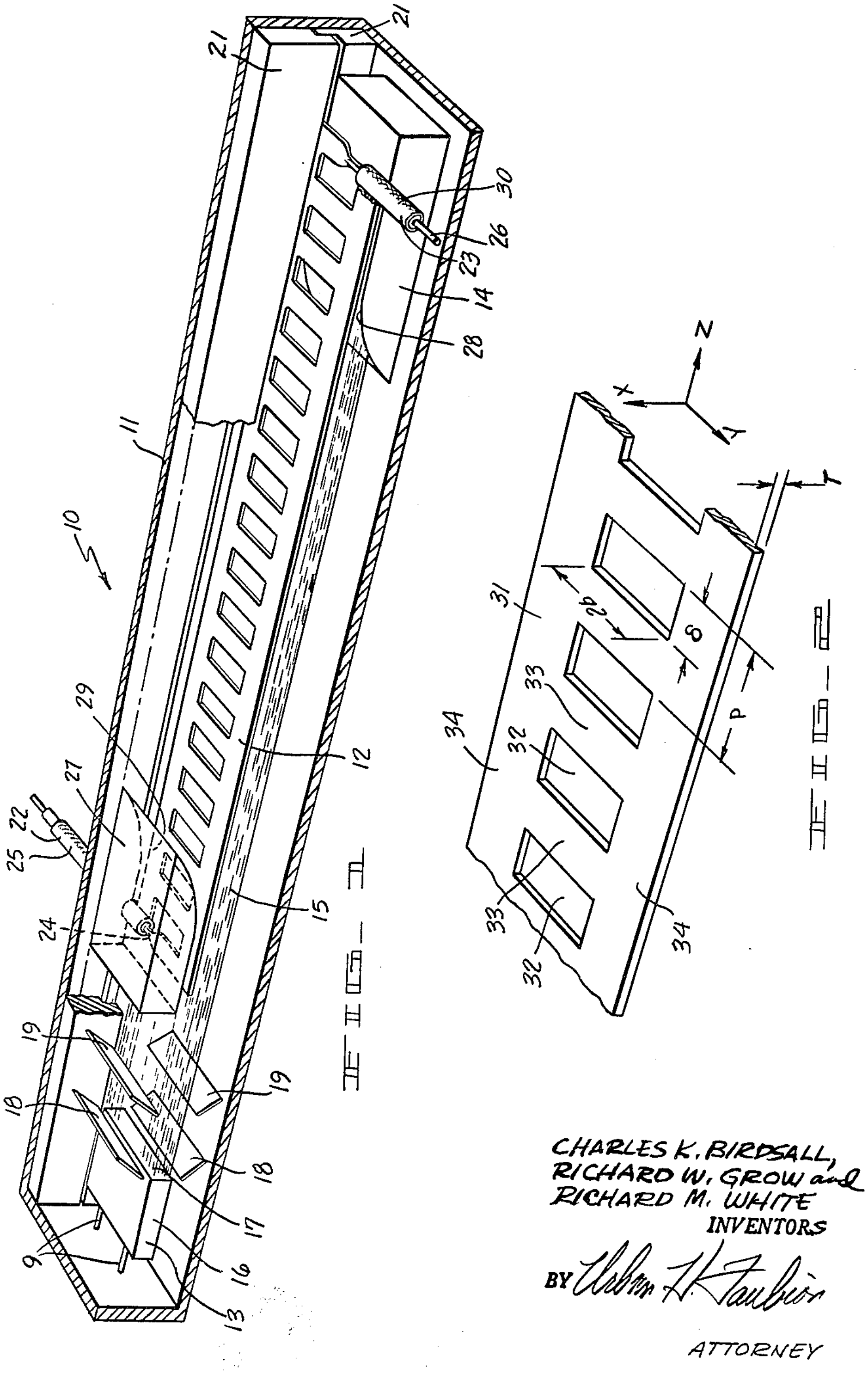
FIGURE 1 is a partially broken away perspective view of an energy interchange device which employs a ladder circuit.
FIGURE 2 is a perspective view illustrating a simple ladder structure along with the coordinate system and symbols used in the description of all of the figures.

FIGURE 1 illustrates a linear sheet stream type high frequency energy interchange device 10 of the traveling wave type which employs a ladder type slow wave circuit 12. The device 10 includes an enclosed and evacuated envelope 11 having a rectangular cross section. Envelope 11 encloses the ladder type transmission line 12, a sheet stream producing electron gun 13 at one end, and an impedance matching and electron-collecting member 14 at the opposite end of the device. The electron gun 13 produces and directs a sheet-like stream of electrons 15 down the length of the envelope 11 beneath and in close proximity to the ladder type slow wave circuit 12 and the electrons are collected at the opposite end of the device on the collector and matching member 14. The electron stream 15 and the electromagnetic waves propagated down the ladder type slow wave circuit 12 interact to produce amplification. The configuration of the ladder circuit is described in detail in connection with FIGURE 2.

The electron gun 13 is illustrated rather diagrammatically since it is a conventional gun for producing rectilinear electron flow. The gun includes a cathode member 16 with an electron emissive surface 17, two pairs of electron focusing and directing electrodes 18 and 19, respectivley, and heater elements which are not shown. Each of the pairs of electron focusing and directing electrodes 18 and 19 includes two substantially planar, rectangular conductive plates spaced fare enough apart to allow the rectilinear stream of electrons 15 to pass between them and sloped to insure that the electron accelerating and directing electric fields therebetween have the desired configuration. The design considerations for a gun of the type illustrated are discussed in the book entitled "Theory and Design of Electron Beams," 2nd edition by J. R. Pierce, Van Nostrand Company, Inc., New York (1954) in section 10.1 at page 174 et seq. The particular type gun illustrated is shown in the Pierce book in FIGURE 10.5 on page 178. Leads 9 are brought in through the outer end wall of the device to energize the gun electrodes. Only two such leads are illustrated, but other leads are normally provided to establish electrode potentials. A magnetic focusing field is also provided to focus the electron stream 15. This is typically provided by a solenoid (not shown) external to the device.

The substantially planar ladder type slow wave circuit 12 is suspended with its plane generally horizontal and parallel to the plane of the sheet electron stream 15 by means of insulating supporting strips which extend down the full length of the energy interchange device 10. A pair of insulating strips 21 is provided along each side of the device; however, it is not convenient to illustrate both pairs of strips. The strips are all identical, are generally L-shaped in cross section and are arranged in the same general manner on opposite sides of the device. The pair of slow wave circuit supporting insulating strips 21 are arranged along one side wall of the envelope 11 in such a manner that the legs of the L's mate to support one edge of the slow wave circuit 12.

The particular device illustrated operates as a forward wave amplifier. As a consequence the radio frequency energy is introduced onto the slow wave circuit 12 by means of a coaxial transmission line 22 at the gun end of the device and the amplified radio frequency energy is abstracted by means of the coaxial transmission line 23 at the collector end. The input coaxial transmission line 22 includes a center conductor 24 which is connected to the input end of the slow wave transmission line and an outer conductive sheath 25 which is brought into the energy interchange device and connected to an input impedance matching conductive member 27. In a corresponding fashion, the output coaxial conductor 23 includes an inner conductor 26 which is connected directly to the slow wave transmission line 12 at its output end and an outer conductive sheath 30 which is connected to the output impedance matching and collector member 14.

Impedance matching members 14 and 27 are of substantially identical geometrical configuration although, as illustrated, the size of the two members may differ. The portion of the members which accomplishes the matching function is the conductive surfaces 28 and 29 respectively, which are best described as having generally parabolic shapes when viewed from the side. The shape is not necessarily derived from any known geometrical figure but is designed to give the desired transition in impedance between the transmission lines under consideration. The proper impedance match is accomplished between the coaxial transmission line 22 at the gun end of the tube by positioning the matching member 27 in such a manner that its conductive surface is near the gun end and slopes away from the circuit.

Conversely, the conductive surface 28 of the collector impedance match member 14 is relatively far from the slow wave circuit 12 at the end where it collects electrons and is very near the slow wave circuit near the coaxial transmission line 23. Thus, the electron stream 15 is collected on the front portion of the collector 14 where the collector has little effect on the impedance of the slow wave circuit 12.

Both of the matching members 14 and 27 are illustrated as solid members. This is done because it is a simple construction and such members can easily be brazed to the walls of the envelope 11. However, the matching members may be made hollow to provide for coolant or of any other desired construction.

The impedance matching arrangement does not form a part of the same invention but is described and claimed in United States Patent 2,962,620, November 29, 1960, issued in the name of Ward A. Harman and assigned to the assignee of the present invention.

The slotted plane ladder slow wave circuit 12 utilized in the traveling wave tube of FIGURE 1 is illustrated in more detail in FIGURE 2. This circuit may be considered the basic ladder circuit. The circuit is composed of a single planar conductive member 31 with a series of rectangular slots 32 disposed at regular intervals down its length. The slots 32 thus define a series of ladder rungs 33 down the length of the circuit and planar side pieces 34 which resemble the uprights of an ordinary ladder.

In order to facilitate discussion of the ladder circuit a three dimensional coordinate system is given in FIGURE 2 by three arrows $x$, $y$, and $z$. The $z$ direction is along the length of the ladder circuit, the $x$ direction is perpendicular to the plane of the ladder circut and the $y$ direction is perpendicular to the length of the ladder circuit and in the plane thereof. The thickness of the ladder is indicated by the letter T and the length of each of the ladder rungs is $2b$. The ladder pitch, that is, the distance between corresponding points on adjacent rungs is indicated by the letter P and the width of the ladder slot is given by the Greek letter $\delta$· Waves propagate along the ladder, with electromagnetic energy progressing from slot to slot. There is no need for a nearby second conductor nor a complete enclosure. Electric field lines are directed from one rung to another, very close to the plane of the ladder, decaying exponentially away from the plane and varying sinusoidally from one end of the slot to the other. The radio frequency currents flow along the rungs and around the ends of the slots.

The nature of the waves is sensitive to the relative shape and size of the rungs and slots. All field quantities depend on $z$ (distance down the circuit) and $t$ (time) as the exponential $$j[(\omega t-\beta z)]$$

where $\omega=2\pi$ (frequency)

and $\beta$=a phase constant.

The velocity characteristic will be given in terms of the familiar $\omega$-$\beta$ diagrams in which the phase velocity $(v_p)=\omega/\beta$ and the group velocity $$v_g=1/\frac{\gamma\beta}{\gamma\omega}$$

as usual, $k=\omega/c$ (when $c$ is the velocity of light. The $\omega$-$\beta$ diagram for the simple ladder of FIGURE 2 is shown in FIGURE 3. At very low frequencies the circuit propagates with group and phase velocities both equal to the velocity of light and at nearly zero impedance; as the frequency for slot resonance is approached the group velocity tends toward zero and the impedance approaches infinity. This frequency depends on the shape of the slot and, for rectangular slots, corresponds to a slot length of about a half free-space wavelength, or $kb=\pi/2$.

As with all axially periodic structures, a set of spatial harmonics with phase constants $$\beta_n=\beta_o+2\pi n/p \quad n=0,\pm1,\pm2$$

is required to meet the boundary conditions. In FIGURE 3 the $n=0$ component is shown with a continuous line, the $n=-1$ component, a dashed line. Propagation is allowed only in certain well defined regions and is forbidden outside, in order that the energy required be finite. Near the slots, the fields may be assumed to vary with $x$ and $y$ as $$\exp (K_x^x) \cos (K_y^y) \text{ where } \beta^2-k^2=K_x^2-k_y^2$$

In order that the fields decay away from the plane it is necessary that $K_x^2 \geqq 0$.

The boundary of the region where this inequality is valid is given by the equality $$\beta^2=K^2-k_y^2$$

It might appear from this equation that some propagation at a phase velocity greater than $c$ could occur; however, the set of required wave numbers, $k_y$, includes the value zero for the plane extending to infinity in the $y$ direction so that the boundary is $$\beta=\pm k$$

One also arrives at this same answer by considering the fields far from the structure; there the fields must vary as $$K_1(\partial r) \text{ where } \gamma^2=\beta^2-k^2, r^2=x^2+y^2$$

then it is readily seen that to have the fields decay at $r$ 00 forces $\delta^2 \geqq 0$, leading to the same answer as above. Note that the boundary equation applies to all the spatial harmonics as well as to the fundamental.

The simple ladder is one of the charter members of the class of so-called "open circuits," and shares the same forbidden and propagating regions. Experimental evidence of the field behavior in $x$ and $y$ supports the assumption given above; all of the circuits tested appear to operate only in propagating regions.

The interaction impedance of interest is the voltage-power impedance measured along the path to be followed by the electron stream, and is generally given by $$K_n=E^2zn/2B^2{}_{nP}$$

Figure 4:
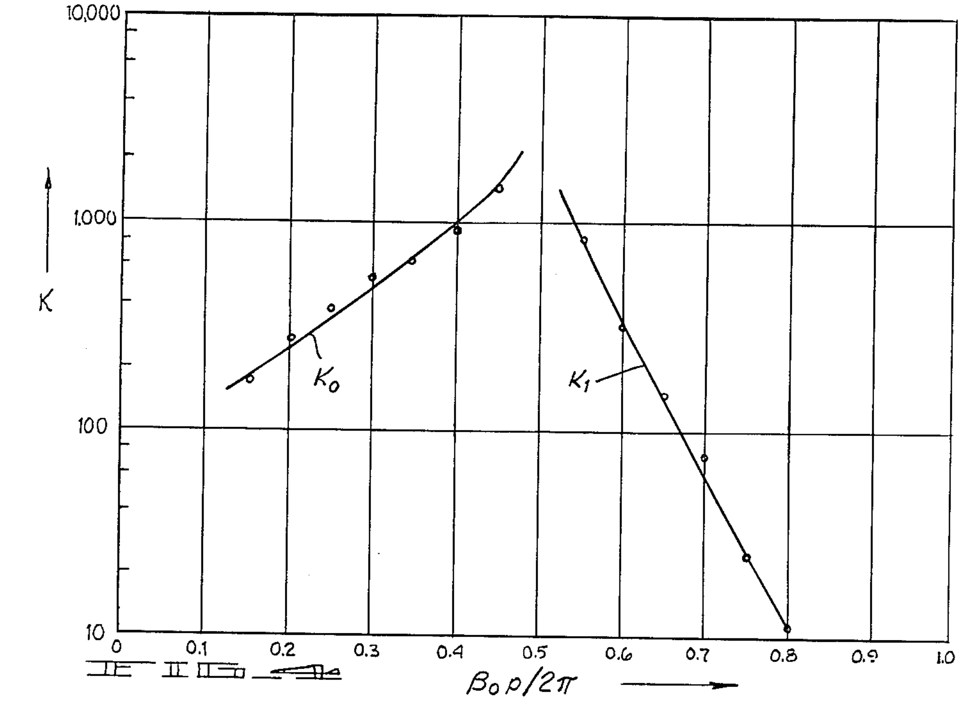
FIGURE 4 is a graph illustrating the interaction impedance of the circuit of FIGURE 2.

One path amenable to accurate measurement, although not the usual path for the stream, is at the very center of the ladder rungs; along this path the impedance will probably be higher than at the edge of the rungs, most certainly higher than the impedance averaged over the area occupied by the electron stream(s). For the ladder used for FIGURE 3, the impedance measured on this path is shown in FIGURE 4 for the $n=0$ and $n=-1$. The values were obtained by perturbing the longitudinal electric field $E_2$ with a small diameter dielectric rod inserted through a small hole in the center of the rungs and the $z$ axis.

The relatively large values of interaction impedance $K_n$ constitute the major (electrical) attraction to using the ladder. To be sure, the resonance and vanishing group velocity are contributing causes. Any circuit which can be made to have a resonance can have a pole in its impedance variation; the unadorned ladder, with its simple field structure has most of its stored energy W in $E_{zo}$ and $E_z-1$ so that the large values of $K_n$ are not due solely to the resonance. This last observation is most important when considering the impedance to be found with variations of the basic ladder circuit; unfortunately, although velocity has been measured for many variations, impedance has not. A detailed analysis of the interaction impedance, the effect of the thickness T of the ladder and the effect of pitch is given in a paper published by the inventors in Proceedings of the Symposium of Millimeter Waves, Polytechnic Press of the Polytechnic Institute, Brooklyn, New York, page 367 ff, 1960.

The transmission properties of the ladder circuit depend on the radio frequency coupling of one slot to the next. The coupling is determined by the configuration of the rungs themselves or by additional loading placed near or on the ladder. These circuits may be called "loaded" ladder circuits. Loading of the ladder may alter markedly the propagation characteristics of the plane ladder, making possible the design of circuits having band pass or other characteristics which may make them more suitable for electron stream interaction. A number of these special circuits along with their use in traveling wave tubes is discussed here.

Coupling is of two types: Magnetic (or inductive) coupling which has its origin in the interaction of current and magnetic fields associated with the seperate rungs and electric (or capacitive) coupling due to the interaction of surface charges in electric fields on separate rungs. The magnetic fields and conducting currents are strongest at the roots of the rungs. Loading at the roots (outer ends of the rugs) will then be expected to alter mainly magnetic coupling; this loading in its simplest form uses conducting planes normal or at an angle to the ladder planes. The electric field and surface charges are strongest at the center of the rung so that changing capacitance at near the center of the rungs alters mainly the electric coupling.

Figure 5:
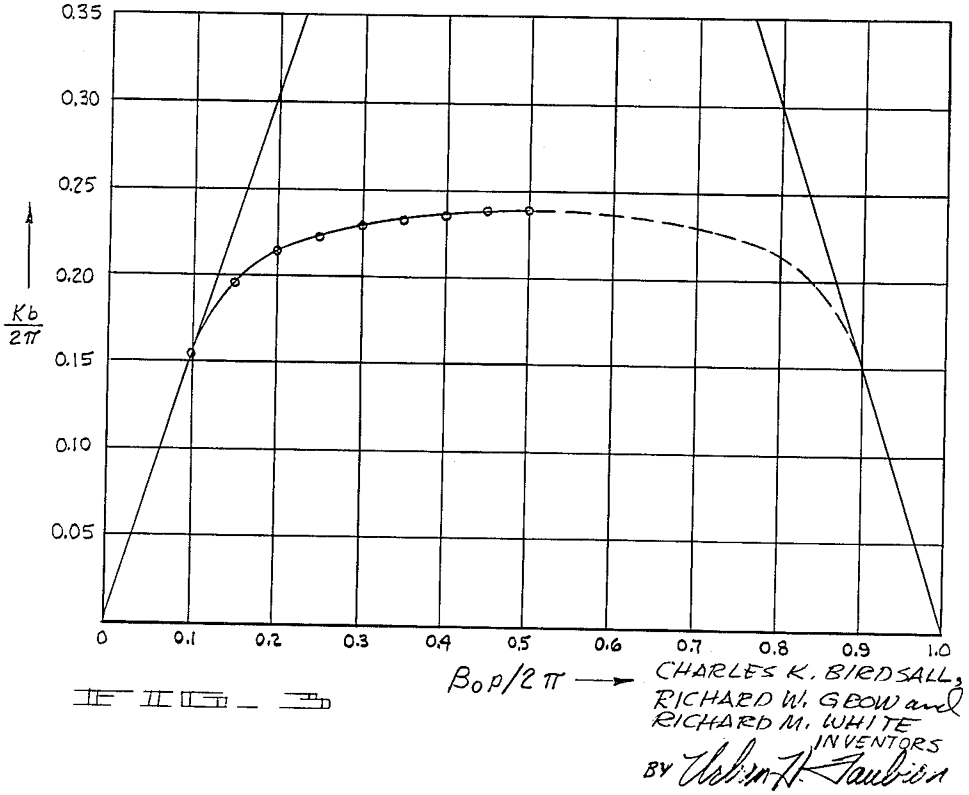
FIGURE 5 is a perspective view illustrating a ladder circuit with slanted shorting planes.
Figures 5, 6:
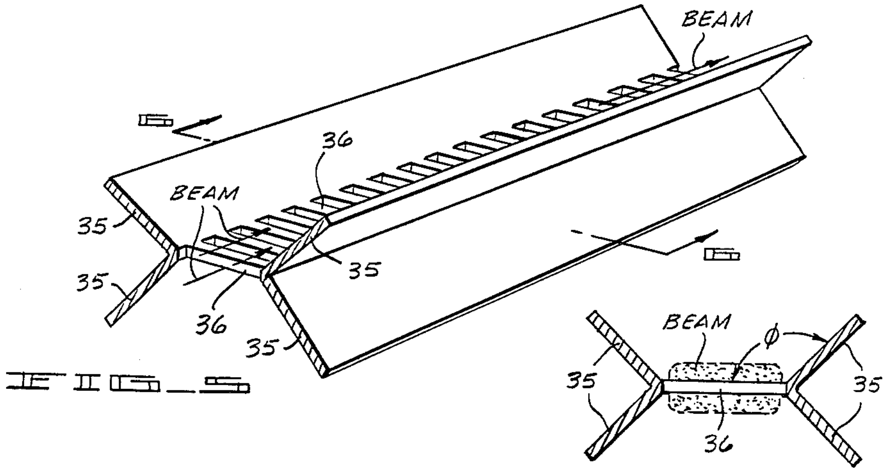
FIGURE 6 is a cross sectional view of the ladder circuit of FIGURE 5 taken along section lines 6—6.

One method of loading a ladder circuit is illustrated in FIGURES 5 and 6. Slanting side plates 35 have been set at either end (the roots) of the ladder rungs 36. The ladder rungs 36 are rectangular shaped and the slanting side plates 35 are rectangular plates which are positioned at an angle $\phi$ with respect to the plane of the ladder rungs. These slanting side plates 35 alter the radio frequency current paths at the end of the rungs, and, when the plates slant inward they affect the electric field distribution. The resultant of propagation characteristics for these structures are illustrated in the $\omega$-$\beta$ diagram of FIGURE 7.

Figure 7:
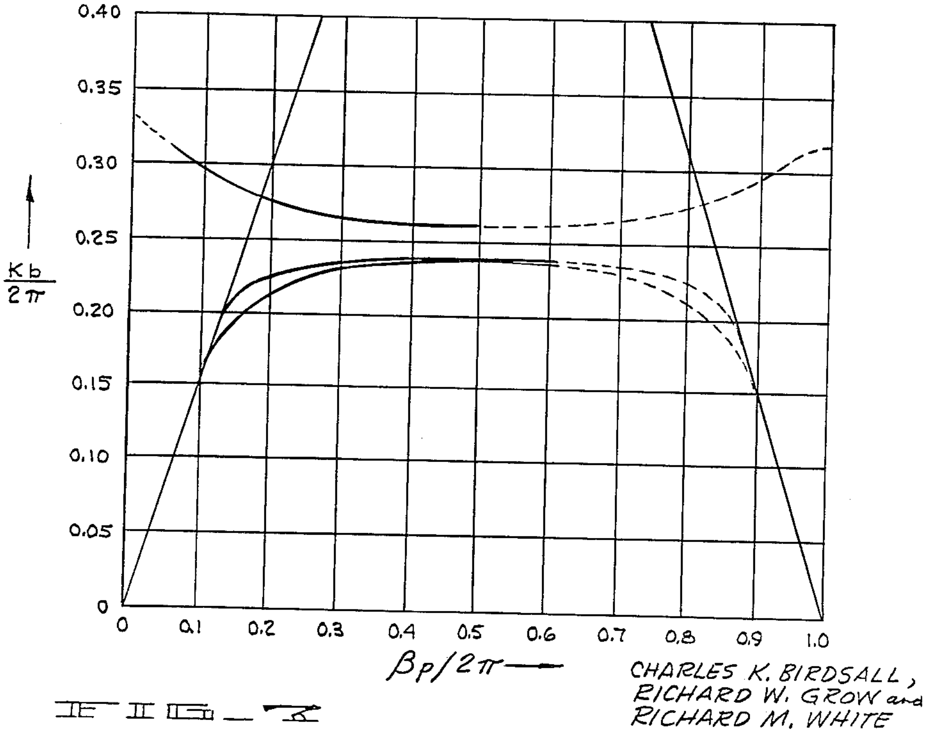
FIGURE 7 is an $\omega$-$\beta$ diagram for the ladder circuit of FIGURES 5 and 6 utilized in explaining the characteristics of the ladder circuit.

The lowest curve illustrated in FIGURE 7 is for $\phi=180°$, that is, for the simple slotted plane ladder. As $\phi$ is decreased, i.e., the angle of the side plates 35 with respect to the rungs 36 is decreased, the magnetic coupling of separate rungs 36 is decreased and the structure becomes a less broadband slow wave circuit. For example, see the middle curve of FIGURE 7 which was taken with the side plates 35 at an angle of 135° relative to the plane of the rungs 36. For $\phi$ greater than 90° and less than 180° the circuit is a fundamental forward wave circuit. At $\phi=90°$ the side plates 35 are vertical and a non-propagating circuit results which circuit is referred to in the art as the easytron circuit. The electric and magnetic couplings are equal and opposite for this condition. When the side plates 35 slant inward ($\phi=60°$), the balance between electric and magnetic coupling is destroyed, electric coupling predominates and the circuit has a fundamental backward wave characteristic. This condition is illustrated by the top curve of FIGURE 7. A higher mode exists for this circuit ($\phi=60°$) but is not illustrated in the figure.

Figure 8:
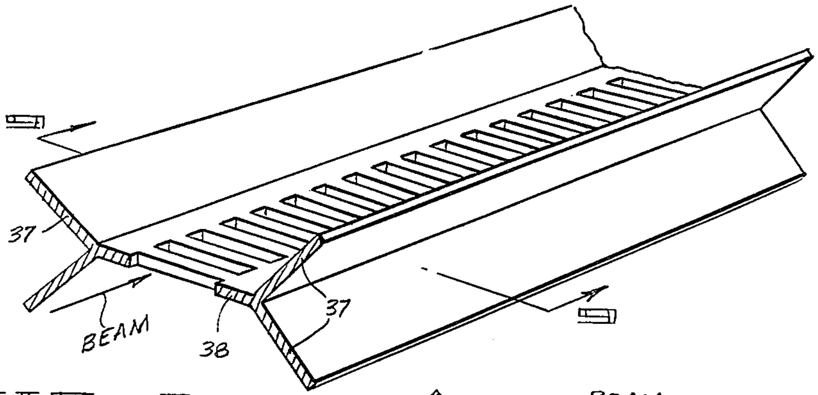
FIGURE 8 is a perspective view of another ladder circuit utilizing slanting side planes spaced from the ends of the ladder rungs.
Figure 9:
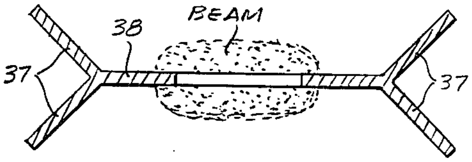
FIGURE 9 is a cross-sectional view of the circuit illustrated in FIGURE 8 taken along section lines 9—9.

The circuit of FIGURES 8 and 9 is similar to the circuit illustrated in FIGURES 5 and 6 in that it is provided with slanted shorting planes 37 but differs from that circuit in that the shorting planes are spaced away from the ends of the ladder rungs 38. With this circuit fundamental forward wave or backward wave behavier is possible depending upon whether the angle $\phi$ or the shorting planes with respect to the ladder rungs 38 is made greater or less than 90°. For angles of $\phi$ greater than 90° but less than 180° a fundamental forward wave behavior is obtained; side plates need not extend very far from the ladder. For the angle greater than 0° but less than 90° a backward wave fundamental is obtained (along with a fast wave waveguide mode); the side planes now may touch but need not touch.

Figure 10:
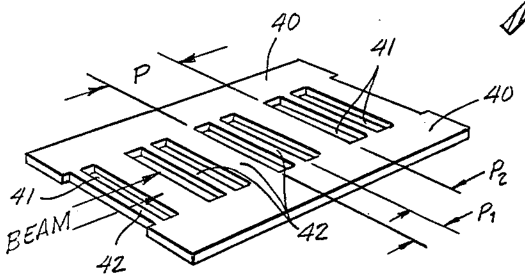
FIGURE 10 is a perspective view of a ladder circuit with staggered spacing between rungs (staggered pitch)

Another ladder configuration which provides useful characteristics is obtained by spacing successive slots by different distances as illustrated in FIGURE 10. The planar conductive member 40 is provided with rectangular slots 41 which are aligned along the length but spaced so that two different distances or pitches $p1$ and $p2$ are provided between adjacent ladder rungs 42. Thus, the total pitch P (distance between corresponding points on corresponding ladder rungs 42) is equal (or incremental) to the sum of the two minor pitches $p1$ and $p2$. Thus, there are two slots 41 and two rungs 42 per pitch P which may be advantageous. Varying the pitch of every other bar in a regular manner alters both the electric and magnetic coupling in a way which essentially cancels. Thus leaving little net change in characteristics ($\omega$-$\beta$ or impedance) from the plain ladder circuit.

Figure 12:
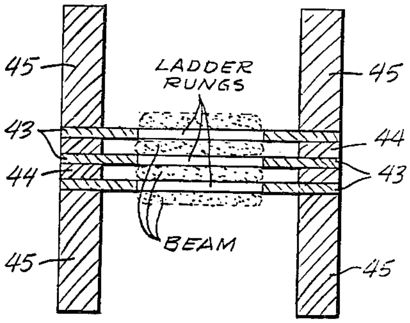
FIGURE 12 is an end view of the stacked array of ladders illustrated in FIGURE 11 showing the position of the electron beam.
Figure 11:
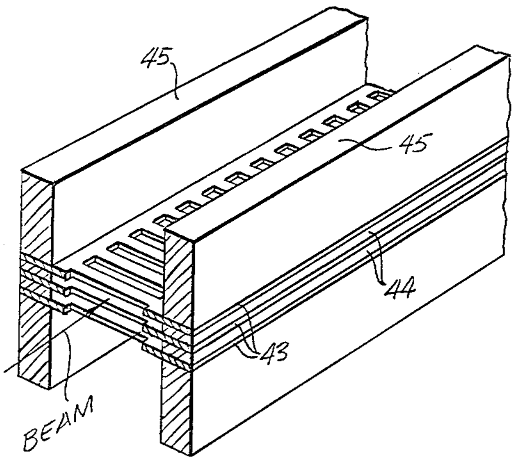
FIGURE 11 is a perspective view of stacked paralleled ladders.
Figure 13:
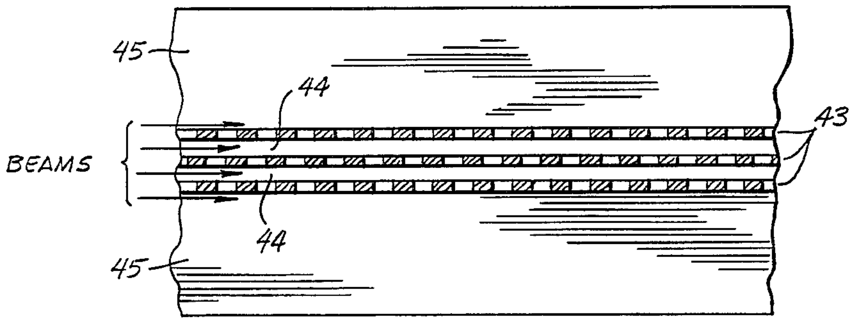
FIGURE 13 is a central longitudinal section of a portion of the ladders stacked in the manner illustrated in FIGURE 12 showing how the rungs of the ladders may be staggered to obtain unique characteristics.

Production of large amounts of power at millimeter wavelengths using slow wave interaction may be realized by proper use of the ladder circuits thus far described. That is, by the proper use of multiple ladder circuits in parallel. A primary requisite for useful paralleling of ladders is that the separate circuits by tightly enough coupled to force phase synchronism of the waves travelling along the individual ladder circuits so that the circuits, in effect, behave as a single circuit with a single electromagnetic wave. FIGURES 11–13 illustrate ladder circuits which are paralleled closely enough to provide such coupling. Two major unexpected results accrue from close coupling of the parallel ladders. One is that close coupling forces wave phase synchronism and another is that which has not been provided by any other worker in the field as far as is known. The useful electric field increases by a factor greater than the number of ladder circuits paralleled.

The type of paralleling of ladder circuits contemplated may be seen by referring to FIGURES 11 and 12. These figures show three plane ladder circuits 43 stacked one above the other and spaced apart by conductive strips 44 which are as long as the circuits, are rectangular in cross section and positioned between the outer edges of their individual ladders 43. The thickness of the strips is selected to provide proper spacing. The electron stream may pass between the circuits and outside the circuits (see FIGURE 12). Additional long rectangular conductive supporting blocks 45 are shown at the outer edges of the circuit both above and below the ladders 43 to show how they may be supported in a tube such as the one illustrated in FIGURE 2. The rungs of the ladders may be positioned in vertical alignment or as illustrated in FIGURE 13 they may be staggered. That is, the rungs of one of the outside ladders 43 may be placed above spaces or slots of the inside ladder. Staggering the rungs gives a fundamental backward wave device. In any case the conductive strips 44 and 45 form conductive side plates for the individual ladders 43.

In view of the importance of the parallel circuits and close coupling of these circuits, some elaboration may be in order. It is recognized that with a circuit such as the slotted plane ladder the amplitude of the axial electric field dies rapidly (exponentially) with distance from the circuit. At very high frequencies and at stream voltages of a few kilovolts, the electric field decays so rapidly with distance away from the circuit that only a small amount of the electron current is effectively interacting with the circuit. The effective current is only that lying within the "skin depth" of the surface, where the skin depth is about $\frac{1}{4}\pi$ times the slow-wavelength of the circuit. It has been found that the traveling wave tube efficiency is roughly proportional to the fraction of the total current which flows where the electric field amplitude is equal to no greater than 85 percent of its value at the stream edge. Thus, in a millimeter wave tube having a single slow-wave circuit and beam, owing to the exponential field dependence, the efficiency may necessarily be very low.

If the multiple ladder circuits are located near enough to each other so that the electric fields of separate circuits are additive, a given stream may interact with fields of several circuits. It was found that the effective interaction impedance per cell of such a multiple circuit is increased as the number of cells is increased. Since there is with the multiple circuit the capability of greater useful stream current the gain per unit length (the gain parameter, C, used in the art) is increased still further and the efficiency is further increased. When N separate tubes are paralleled, the maximum possible output is just N times that of a single tube; but when N circuits and streams are paralleled with close coupling the resultant output power is from 5N to 10N times that obtainable from a single stream and circuit.

This brings us back to the matter of spacing. The vertically stacked ladder circuit shown in FIGURES 11 and 12 has the ladders saced a distance $2a$ apart. A proper inter-ladder spacing, $2a$, may be found for a given set of desired conditions by making $2\gamma a \approx 1$. Where $\gamma$ is the propagation constant in the $x$ direction. That is, an expression of the manner in which electric fields decay in the $x$ direction may be expressed in a variety of ways but for design purpose it is convenient to derive $\gamma$ as a function of the frequency of interest, the desired circuit cutoff frequency and the beam accelerating voltage. An elaborate discussion of the propagation constant is not considered in great detail here since it is well known to those skilled in the art and is discussed in detail in many standard texts, for example, see J. R. Pierce Traveling Wave Tubes, Van Nostrand, 1950.

Figure 14:
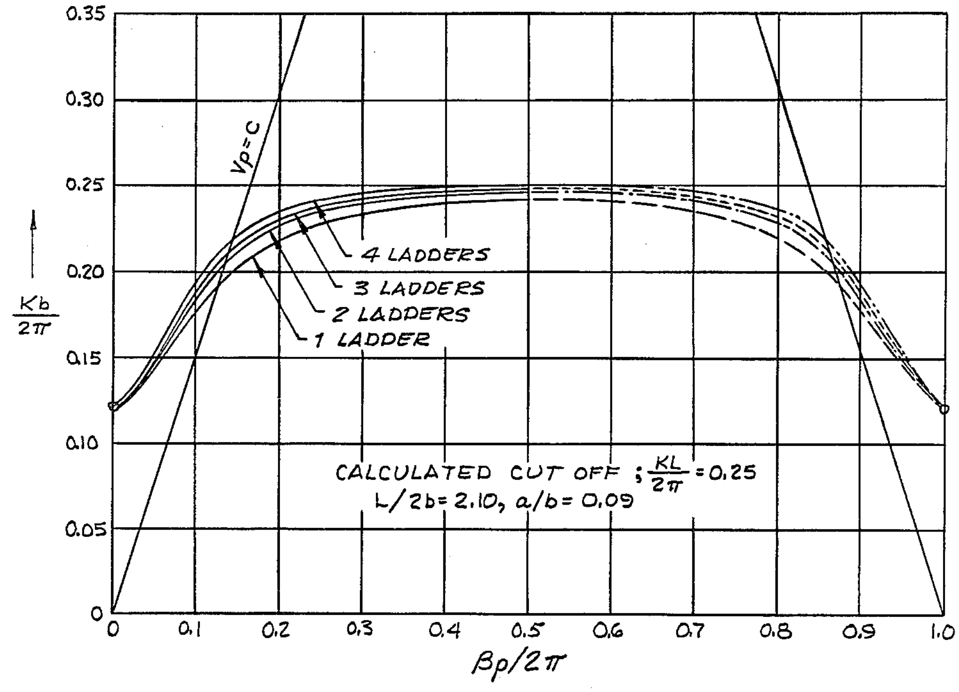
FIGURE 14 is an $\omega$-$\beta$ diagram utilized in explaining the effect of paralleling single ladders.

The propagation characteristics of the longitudinal mode of two, three, and four tightly coupled ladders are shown in FIGURE 14. The circuit becomes more dispersive as the number of ladders is increased, but the greatest increase in dispersion takes place in going from the single to the two-ladder circuit. The increase in dispersion should not be taken automatically to mean reduction in achievable bandwidth; as streams and circuits are paralleled, impedance, and hence gain per wavelength increase, decreasing the number of wavelengths needed for a given gain, allowing greater dispersion for a given bandwidth.

As with the other $\omega$-$\beta$ diagrams which have been included here, the data of FIGURE 14 were obtained using a section of the slow-wave circuit some 10 pitches long with shorting planes at each end. Thus propagation with phase fronts perpendicular to the axis of the structure (that is, normal to a ladder plane) was assured. In a long circuit containing many separate ladders, however, plane wavefront propagation is not automatically insured, and it would be necessary to provide the proper R.F. transition between the structure and the external transmission medium to avoid setting up skewed wavefronts in the circuit.

While particular embodiments of the invention have been shown it will, of course, be understood that the invention is not limited thereto since many modifications both in the circuit arrangements and instrumentalities employed may be made. It is contemplated by the appended claims that cover any such modifications as fall within the true spirit and scope of the invention.

What we claim as new and desire to secure by Letters Patent of the United States is:

1. A high frequency energy interchange device including an evacuated envelope, a slow wave transmission line positioned within said envelope, an electron stream producing means positioned at one end of said evacuated envelope for producing a stream of electrons in the axial direction within said evacuated envelope and in close proximity to said slow wave transmission line, input and output fast wave transmission lines connected to said slow wave transmission line to introduce radio frequency energy thereon and abstract radio frequency energy therefrom respectively, said slow wave transmission line including at least one substantially planar portion having conducting rungs positioned at recurring intervals down the length of said slow wave transmission line and substantially planar conductive side plates positioned near opposite ends of said rungs both above and below the plane of said rungs and extending down the length of said slow wave transmission line thereby forming a part thereof, said side plates each forming an angle with respect to the plane of said slow wave transmission line other than ninety degrees.

2. A high frequency energy interchange device including an evacuated envelope, a slow wave transmission line positioned within said envelope, an electron stream producing means positioned at one end of said evacuated envelope for producing a stream of electrons in the axial direction within said evacuated envelope and in close proximity to said slow wave transmission line, input and output fast wave transmission lines connected to said slow wave transmission line to introduce radio frequency energy thereon and abstract radio frequency energy therefrom respectively, said slow wave transmission line including at least one substantially planar portion having conducting rungs positioned at recurring intervals down the length of said slow transmission line and substantially planar conductive side plates positioned near opposite ends of said rungs both above and below the plane of said rungs and extending down the length of said slow wave transmission line thereby forming a part thereof, said side plates forming an angle greater than ninety degrees and less than one hundred eighty degrees with respect to the plane of said rungs.

3. A high frequency energy interchange device including an evacuated envelope, a slow wave transmission line positioned within said envelope, an electron stream producing means positioned at one end of said evacuated envelope for producing a stream of electrons in the axial direction within said evacuated envelope and in close proximity to said slow wave transmission line, input and output fast wave transmission lines connected to said slow wave transmission line to introduce radio frequency energy thereon and abstract radio frequency energy therefrom respectively, said slow wave transmission line including at least one substantially planar portion having conducting rungs positioned at recurring intervals down the length of said slow wave transmission line and substantially planar conductive side plates positioned near opposite ends of said rungs both above and below the plane of said rungs and extending down the length of said slow wave transmission line thereby forming a part thereof, said side plates forming an angle greater than zero degrees and less than ninety degrees with respect to the plane of said rungs.

4. A high frequency energy interchange device including an evacuated envelope, a slow wave transmission line positioned within said envelope, an electron stream producing means positioned at one end of said evacuated envelope for producing a stream of electrons in the axial direction within said evacuated envelope and in close proximity to said slow wave transmission line, input and output fast wave transmission lines connected to said slow wave transmission line to introduce radio frequency energy thereon and abstract radio frequency energy therefrom respectively, said slow wave transmission line including at least one substantially planar portion having conducting rungs positioned at recurring intervals down the length of said slow wave transmission line and substantially planar conductive side plates positioned at opposite ends of said rungs both above and below the plane of said rungs and extending down the length of said slow wave transmission line thereby forming a part thereof, said side plates each forming an angle with respect to the plane of said slow wave transmission line other than ninety degrees.

5. A high frequency energy interchange device including an evacuated envelope, a slow wave transmission line positioned within said envelope, an electron stream producing means positioned at one end of said evacuated envelope for producing a stream of electrons in the axial direction within said evacuated envelope and in close proximity to said slow wave transmission line, input and output fast wave transmission lines connected to said slow wave transmission line to introduce radio frequency energy thereon and abstract radio frequency energy therefrom respectively, said slow wave transmission line including at least one substantially planar portion having conducting rungs positioned at recurring intervals down the length of said slow wave transmission line and substantially planar conductive side plates spaced from opposite ends of said rungs both above and below the plane of said rungs and extending down the length of said slow wave transmission line thereby forming a part thereof, said side plates each forming an angle with respect to the plane of said slow wave transmission line other than ninety degrees.

6. In a high frequency energy interchange device of the type which depends upon the interaction of an electron stream produced by an electron gun with electromagnetic waves propagated down a slow wave transmission line adjacent the electron stream, a slow wave transmission line including at least one substantially planar portion having conducting rungs positioned at recurring intervals down the length of said slow wave transmission line and substantially planar conductive side plates positioned near opposite ends of said rungs both above and below the plane of said rungs and extending down the length of said transmission line thereby forming a part thereof, said side plates each forming an angle with respect to the plane of said transmission line other than ninety degrees.

7. In a high frequency energy interchange device of the type which depends upon the interaction of an electron stream produced by an electron gun with electromagnetic waves propagated down a slow wave transmission line adjacent the electron stream, a slow wave transmission line, including at least one substantially planar portion having conducting rungs positioned at recurring intervals down the length of said slow wave transmission line and substantially planar conductive side plates positioned near opposite ends of said rungs both above and below the plane of said rungs and extending down the length of said transmission line thereby forming a part thereof, said side plates forming an angle greater than ninety degrees and less than one hundred eighty degrees with respect to the plane of said rungs.

8. In a high frequency energy interchange device of the type which depends upon the interaction of an electron stream produced by an electron gun with electromagnetic waves propagated down a slow wave transmission line adjacent the electron stream, a slow wave transmission line, including at least one substantially planar portion having conducting rungs positioned at recurring intervals down the length of said slow wave transmission line and substantially planar conductive side plates positioned near opposite ends of said rungs both above and below the plane of said rungs and extending down the length of said transmission line thereby forming a part thereof, said side plates forming an angle greater than zero degrees and less than ninety degrees with respect to the plane of said rungs.

9. In a high frequency energy interchange device of the type which depends upon the interaction of an electron stream produced by an electron gun with electromagnetic waves propagated down a slow wave transmission line adjacent the electron stream, a slow wave transmission line including at least one substantially planar portion having conducting rungs positioned at recurring intervals down the length of said slow wave transmission line and substantially the planar conductive side plates positioned at opposite ends of said rungs both above and below the plane of said rungs and extending down the length of said transmission line thereby forming a part thereof, said side plates each forming an angle with respect to the plane of said transmission line other than ninety degrees.

10. In a high frequency energy interchange device of the type which depends upon the interaction of an electron stream produced by an electron gun with electromagnetic waves propagated down a slow wave transmission line adjacent the electron stream, a slow wave transmission line including at least one substantially planar portion having conducting rungs positioned at recurring intervals down the length of said slow wave transmission line and substantially planar conductive side plates spaced from opposite ends of said rungs both above and below the plane of said rungs and extending down the length of said transmission line thereby forming a part thereof, said side plates each forming an angle with respect to the plane of said transmission line other than ninety degrees.

11. A high frequency circuit comprising a slow wave transmission line, said line including at least one substantially planar portion having conducting rungs positioned at recurring intervals down the length of said line and substantially planar conductive side plates positioned near opposite ends of said rungs both above and below the plane of said rungs and extending down the length of said line thereby forming a part thereof, said side plates each forming an angle with respect to the plane of said line other than ninety degrees, an input fast wave transmission line connected to said slow wave transmission line near one end thereof to introduce radio frequency energy onto said slow wave line, and an output fast wave transmission line connected to said slow wave transmission line near the other end thereof to abstract radio frequency energy from said slow wave line.

References Cited by the Examiner

UNITED STATES PATENTS

| | | | |
|---|---|---|---|
| 2,925,567 | 2/1960 | Eichin et al. | 333—31 |
| 2,954,534 | 9/1960 | Neufischer | 333—31 |
| 2,973,453 | 2/1961 | Hogg | 315—3.5 |
| 2,976,454 | 3/1961 | Birdsall et al. | 315—3.5 |
| 3,076,909 | 2/1963 | Hogg et al. | 315—3.6 X |

FOREIGN PATENTS

| | | |
|---|---|---|
| 1,191,327 | 10/1959 | France. |

GEORGE N. WESTBY, *Primary Examiner.*

ROBERT SEGAL, *Examiner.*